(12) United States Patent
Sadeck et al.

(10) Patent No.: US 9,573,691 B1
(45) Date of Patent: Feb. 21, 2017

(54) METHOD TO IMPROVE AERODYNAMIC GLIDE OF A RAM AIR CANOPY

(71) Applicant: The United States of America as represented by the Secretary of the Army, Washington, DC (US)

(72) Inventors: James Sadeck, East Freetown, MA (US); Hamid Johari, Thousand Oaks, CA (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 0 days.

(21) Appl. No.: 14/800,836

(22) Filed: Jul. 16, 2015

(51) Int. Cl.
*B64D 17/02* (2006.01)

(52) U.S. Cl.
CPC .................. *B64D 17/025* (2013.01)

(58) Field of Classification Search
CPC ......... B64D 17/00; B64D 17/02; B64D 17/12; B64D 17/18; B64D 17/20; B64D 17/025
USPC ........................................ 244/145, 146, 152
See application file for complete search history.

(56) References Cited

U.S. PATENT DOCUMENTS

| 3,285,546 A | * | 11/1966 | Jalbert | B64C 31/036 244/145 |
| RE26,427 E | * | 7/1968 | Jalbert | B64C 31/036 244/142 |
| 3,822,844 A | * | 7/1974 | Sutton | B64D 17/025 244/145 |
| 4,175,722 A | | 11/1979 | Higgins | |
| 4,191,349 A | * | 3/1980 | Pravaz | B64D 17/025 244/145 |
| 4,930,728 A | * | 6/1990 | Wittington | B64D 17/025 244/145 |
| 5,169,092 A | * | 12/1992 | Murakami | B64D 17/025 244/145 |
| 5,174,529 A | * | 12/1992 | Jalbert | B64D 17/025 244/142 |
| 5,303,883 A | | 4/1994 | Brewer et al. | |
| 2003/0183725 A1 | | 10/2003 | Preston | |
| 2003/0209634 A1 | | 11/2003 | Preston | |
| 2004/0016851 A1 | | 1/2004 | Preston | |
| 2004/0108417 A1 | | 6/2004 | Preston | |
| 2011/0260004 A1 | * | 10/2011 | Mullins | B64D 17/025 244/123.1 |

* cited by examiner

*Primary Examiner* — Richard G Davis
(74) *Attorney, Agent, or Firm* — Roger C. Phillips

(57) ABSTRACT

A ram air canopy includes a top skin, a bottom skin, a plurality of ribs between the top skin and the bottom skin forming a plurality of cells. A leading edge of a cell includes an opening to allow air to enter the cell. A glide vent is disposed in the top skin to allow air the exit the cell.

18 Claims, 8 Drawing Sheets

METHOD TO IMPROVE AERODYNAMIC GLIDE OF A RAM AIR CANOPY

STATEMENT OF GOVERNMENT INTEREST

The invention described herein may be manufactured and used by or for the U.S. Government for governmental purposes without the payment of any royalties thereon or therefor.

FIELD

The aspects of the present disclosure relate generally to the field of parachutes, and in particular to a design for a canopy of a ram air parachute.

BACKGROUND

Parachutes have evolved over the years into highly sophisticated systems, and include features that improve the safety, maneuverability, and overall reliability of the parachutes. A ram-air canopy or gliding ram air parachute is a form of a self-inflating "ram-air" canopy or airfoil, also know as a parafoil. Such ram air canopies improve the control of speed and direction of parachute type devices.

The U.S. Army Defense Department makes use of airdrop for troop resupply and humanitarian aid. Aircraft vulnerability requires the deployment of gliding ram air parachutes to offset the aircraft at a safe distance and altitude. Once these ram air canopies are open, they are able to glide to the targeted "drop zone" using guidance systems that are GPS controlled. Improving the glide ratio of the ram air canopy provides aircraft commanders with more options and improves aircraft survivability. Increased glide can also offer larger payload capabilities.

The ram air canopy parachute, generally referred to as a ram air canopy, is formed of two layers of material, often referred to as a top skin and a bottom skin. The skins or layers may have different shapes but are commonly rectangular or elliptical. The top and bottom layers are connected by airfoil-shaped, vertically oriented, fabric ribs to form cells. The cells fill with high pressure air from vents that face forward on the leading edge of the airfoil. The fabric is shaped and the parachute lines trimmed under load such that the ballooning fabric inflates into an airfoil shape The canopy of the ram air parachute functions as a wing to provide lift and forward motion. Guide lines operated by a parachutist allows for the deformation of the canopy to control direction and speed. Ram air parachutes have a high degree of maneuverability.

FIGS. 1 and 2 illustrate aspects of a typical ram air canopy 100. FIG. 1 illustrates a spanwise inflated ram air canopy 100. FIG. 2 is the inflated spanwise view of a ram air wing 110 of the ram air canopy 100, looking into an open leading edge 102 of the ram air wing 110.

Two-dimensional numerical simulations of the airflow around ram air canopies, such as the ram air canopy 100 of FIG. 2, have shown a region 120 of separated flow on the lower lip 104 of the open leading edge 102. This region 120 of separated flow, also referred to as a region of low pressure, or flow separation bubble, is caused by the lower lip 104 or edge of the ram air wing 110. This flow separation bubble 120 is generally due to the inability of the flow of air to negotiate the sharp turn at the lower lip or edge 104. Low pressure areas, such as region 120 attached to the lower surface or lip 104 of an airfoil 110, are generally detrimental to the glide ratio.

As is shown in the example of FIG. 2, a vortex 106 forms on an inside of the canopy wing 110, just inside the open leading edge 102. This vortex 106 directs the flow of air toward the lower lip 104 during steady flight, and the opening 108 in the leading edge 102 makes the ram air wing 110 less aerodynamic. In the illustration of FIG. 1, looking into the open leading edges 102 of the ram air canopy 100, the area of separation 120 is shown along the span of the lower canopy surface 112. This flow separation region 120 is quite large when viewed three-dimensionally and produces a large reduction in glide ratio. It would be advantageous to reduce or eliminate the leading edge separation bubble in order to improve the aerodynamic efficiency of a ram air canopy.

There have been various attempts to improve glide capability of ram air canopies by various means. A good example is adding inflatable bladders into the canopy cells. This method adds stiffness to the ram air canopy and provides a leading edge that resembles a rounded wing geometry. This approach has been shown to result in increased performance. However, this method adds complexity to the ram air canopy system with additional hardware for pressure inflation.

Accordingly, it would be desirable to provide a ram air canopy that addresses at least some of the problems identified above.

BRIEF DESCRIPTION OF THE DISCLOSED EMBODIMENTS

As described herein, the exemplary embodiments overcome one or more of the above or other disadvantages known in the art.

One aspect of the exemplary embodiments relates to a ram air canopy. In one embodiment, the ram air canopy includes a top skin, a bottom skin, a plurality of ribs between the top skin and the bottom skin forming a plurality of cells. A leading edge of a cell includes an opening to allow air to enter the cell, and a glide vent disposed in the top skin to allow air the exit the cell.

Another aspect of the disclosed embodiments is directed to a ram air canopy wing. In one embodiment, the ram air canopy wing includes a top surface, a bottom surface, wherein the top surface and the bottom surface defining an opening there between to allow air to flow into the ram air wing. A glide vent is disposed in the top surface of the ram air canopy wing to allow the air to exit the ram air wing.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the present disclosure, and together with the general description given above and the detailed description given below, serve to explain the principles of the present

DETAILED DESCRIPTION OF THE EXEMPLARY EMBODIMENTS OF THE DISCLOSURE

Figure 1:
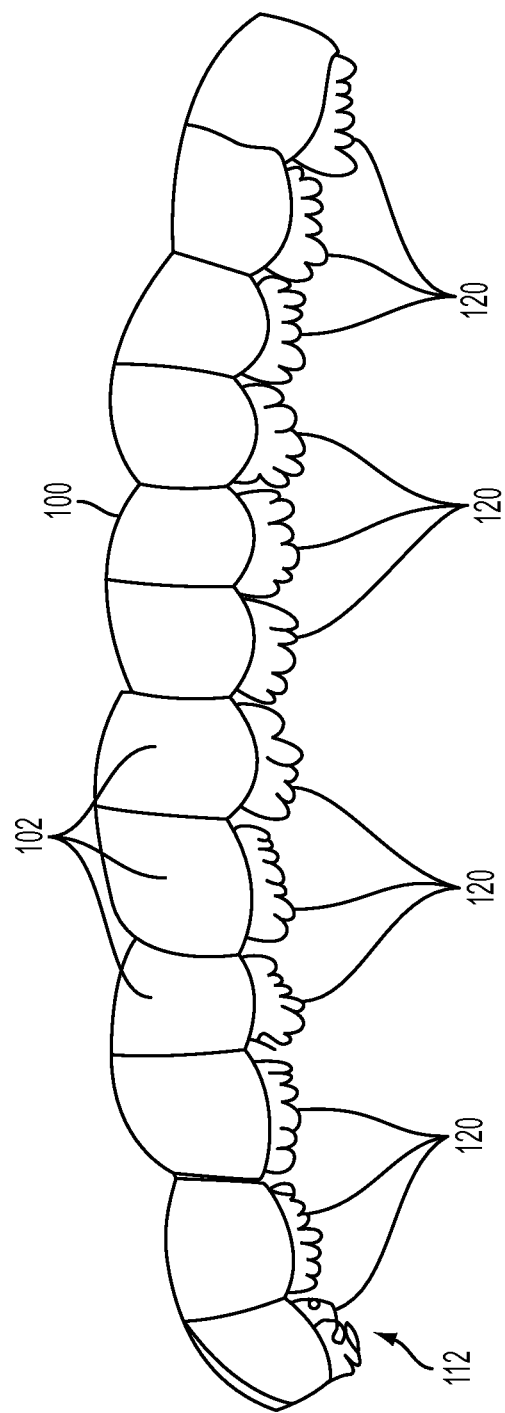
FIG. 1 illustrates a perspective front view of typical ram air canopy, inflated spanwise.
Figure 2:
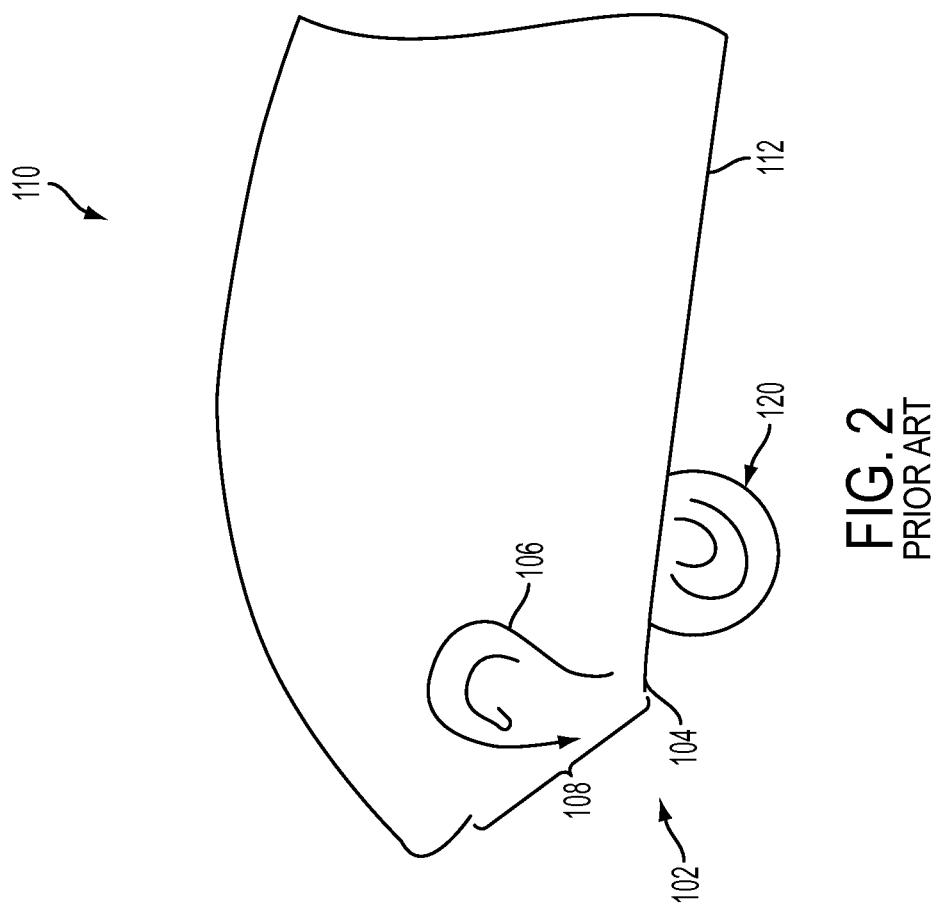
FIG. 2 illustrates a cross-sectional side view of a ram air wing or cell of the ram air canopy shown in FIG. 1.
Figure 3:
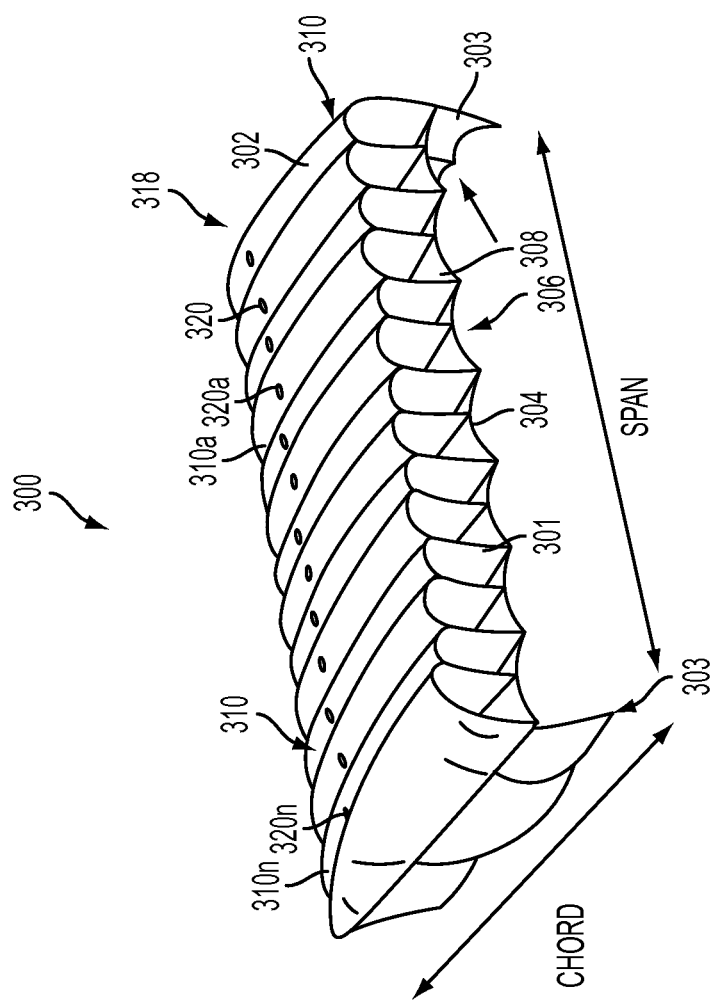
FIG. 3 illustrates a perspective illustration of an exemplary ram air canopy incorporating aspects of the present disclosure.

Referring to FIG. 3, one embodiment of a ram air canopy 300 or parachute incorporating aspects of the disclosed embodiments is illustrated. The aspects of the disclosed embodiments are directed to improving the aerodynamic glide of the air ram canopy 300.

In the example of FIG. 3, the ram air canopy 300 includes a top skin or surface 302 and a bottom skin or surface 304. The top surface 302 and bottom surface 304 are generally formed of a material that is common to ram air canopies and parachutes. A plurality of vertical ribs 301 are formed between the top skin 302 and the bottom skin 304 to form a plurality of cells 310, also referred to as a ram air wing 310, as is generally understood. The ram air canopy 300 of the present disclosure will have a plurality of cells and the aspects of the present disclosure are not intended to be limited by the number of cells of a particular ram air canopy.

Although not necessary for a general understanding of the aspects of the present disclosure, in one embodiment, suspension lines 303 can be attached to one or more of the ribs as is generally understood. The suspension lines 303 are typically connected together to provide proper suspension of the parachutist or payload below the ram air canopy 300 and maintain the structure and the orientation of the ram air canopy 300 with respect to the payload.

As shown in the example of FIG. 3, the leading edge portion 306 of the ram air wing 300 includes an inlet or opening 308. The inlet or opening 308 generally allows allow air to enter the ram air wing 300. As was discussed earlier, this opening 308 at the leading edge 306 makes the ram air canopy less dynamic.

Figure 4:
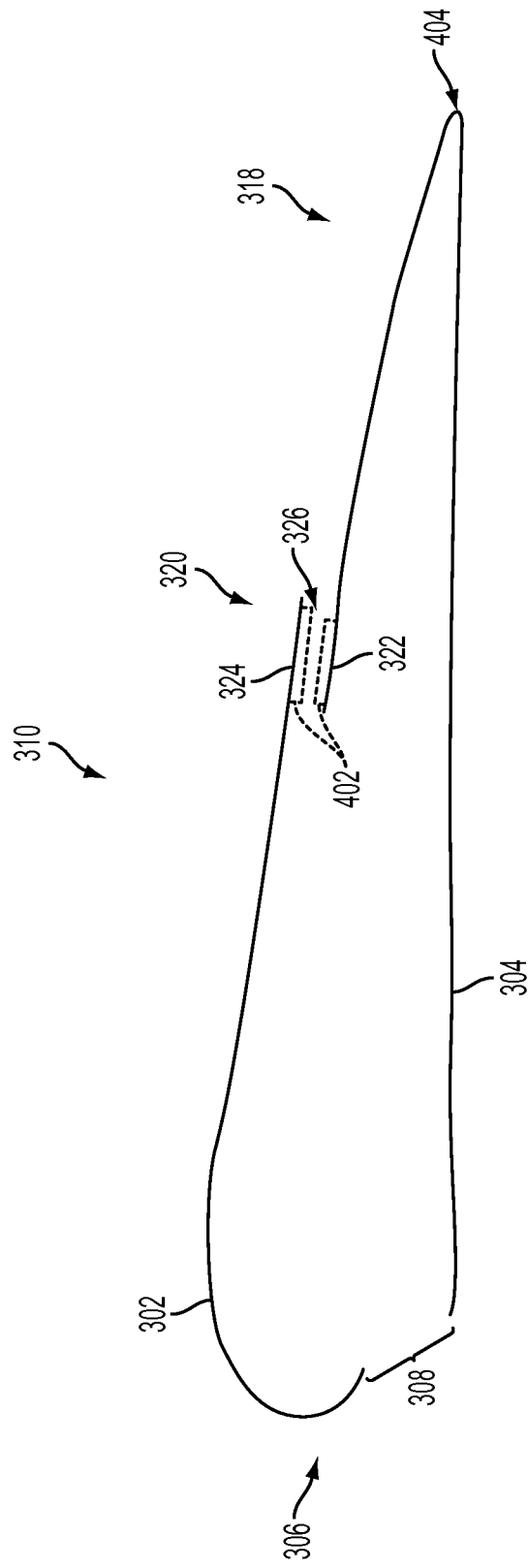
FIG. 4 illustrates a chord wise illustration of the exemplary ram air canopy of FIG. 3, with the glide vent in an open state.
Figure 5:
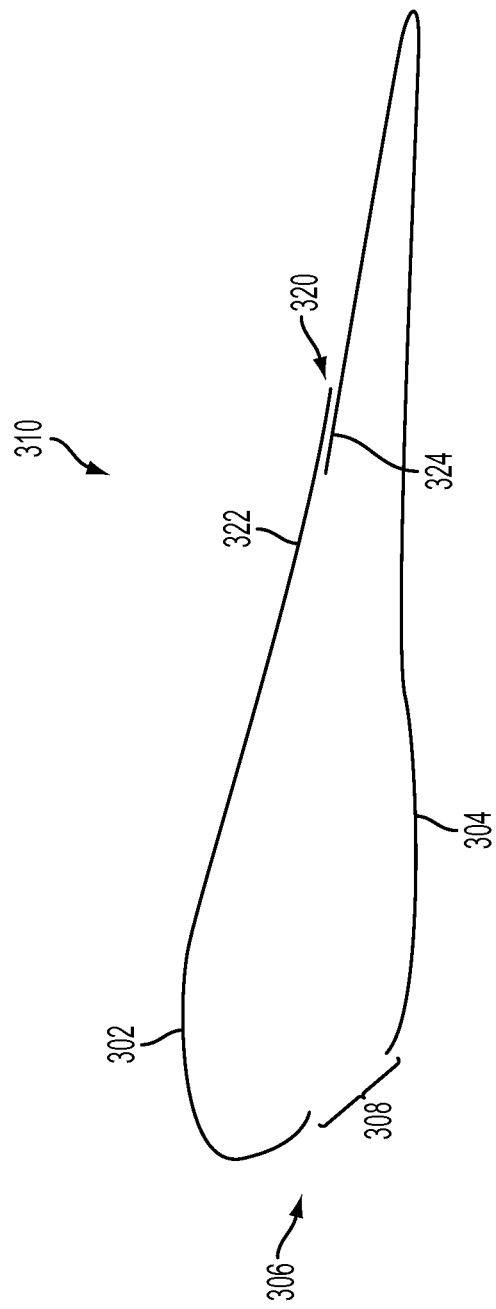
FIG. 5 illustrates a chord wise illustration of the exemplary ram air canopy of FIG. 3, with the glide vent in a closed state.

Referring to FIGS. 3-5, the ram air canopy 300 of the disclosed embodiments will include one or more vents 320 on the top surface 302 of the ram air wing 310. This vent 320 can also be referred to as a glide vent or high glide vent. FIG. 4 illustrates the glide vent 320 in an open position or open state, where an open state enables fluid or air flow through the vent. FIG. 5 illustrates the glide vent 320 in a closed position or closed state, the closed state generally preventing fluid or air flow through the vent.

As is illustrated in FIG. 4, in one embodiment, the glide vent 320 includes a lower member 322 and an upper member 324. The lower member 322 and upper member 324 define an opening 326. In one embodiment, the upper member 324 extends along and over the lower member 322. In the closed state, as illustrated in FIG. 5, the lower member 322 and the upper member 324 are configured to come together to form a seal. In the closed state of the glide vent 320, air flow through the glide vent 320 will be inhibited or generally prevented. In one embodiment, control lines can be coupled to one or more of the upper member 322 and lower member 324 to control an opening and closing of the glide vent 320 by movement of one or more of the upper member 322 and lower member 324.

In one embodiment, air can enter the opening 308 at the leading edge 306 of the ram air wing 310, and exit through the glide vent 320, when the glide vent 320 is in the open state. Although the aspects of the disclosed embodiment illustrate the glide vent 320 being formed by a lower member 322 and an upper member 324, the aspects of the disclosed embodiments are not so limited. In alternate embodiments, the glide vent 310 can be formed or disposed in the upper surface 302 of the ram air wing 310 of a ram air canopy in any suitable manner.

The material of the glide vent 320, including the lower member 322 and upper member 324, can be formed from a material that is the same as or similar to the material of the ram air canopy 300. In alternate embodiments, the material of the glide vent 320 can be any suitable material that enables the formation of the glide vent 320 in the ram air wing 310. In one embodiment, the complimentary edge portions, or other suitable portions, of the lower member 322 and the upper member 324 can include a gasket member 402 to enable a sealing of the glide vent 320 in the closed state of the glide vent 320.

The area of the glide vent 320 generally depend on the desired shape of the glide vent 320, and will be some ratio of the leading edge inlet area 308. This depend on the design of the particular airfoil chosen for the ram air canopy 300. The leading edge inlets 308 will typically have different areas for different designs of airfoils. Choosing an airfoil revolves around the particular mission requirements and what is expected from the entire system. In alternate embodiments, the shape, size and area of the glide vent 320 can be any suitable shape, size and area, depending upon the particular type of air foil and ram air canopy, as noted above.

Although the shape of the glide vent 320 shown in the examples herein is in the form of a square or a rectangle, the aspects of the disclosed embodiments are not so limited. In alternate embodiments, the particular shape of the glide vent 320 can be any suitable shape based on the desired exiting airflow from the glide vent 320. For example, in one embodiment a shape of the glide vent 320 can be substantially in the form of a "V", meaning that the shape of the opening of the glide vent 320, in the open state, is substantially "V" shaped. Alternatively, the shape of the glide vent 320 can be elliptical or tapered. A tapered shape, for example, can provide increase a velocity of the air flow and lower pressure. This can be advantageous in improving the glide ratio and controlling the ram air canopy 300.

In the examples illustrated in FIGS. 3-5, the position and location of the glide vent 320 on the upper surface 302 of the ram air wing 310 is towards the trailing edge 318 of the ram air wing 310. In alternate embodiments, the position, location and size of the glide vent 310 is dependent upon the particular airfoil. In one embodiment, glide vent 320 can be formed in the tail portion 404 of the glide vent 320, where the top surface 302 meets the lower surface 304.

Figure 6:
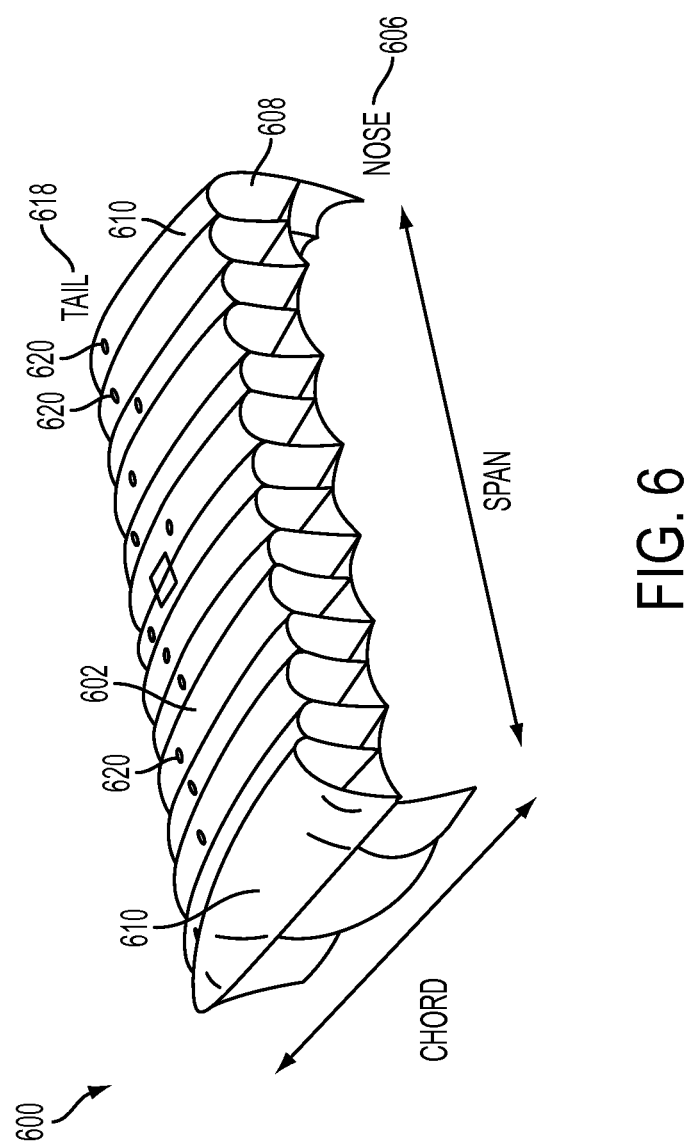
FIG. 6 illustrates a perspective illustration of another embodiment of exemplary ram air canopy incorporating aspects of the present disclosure.

As shown in FIG. 3, in one embodiment, a ram air canopy 300 will include a plurality of glide vents 320, generally corresponding to the number of ram air wings 310, or cells. The position and location of a glide vent 320a on one ram air wing 310a does not have to be the same as the position and location of a glide vent 320n on another ram air wing 310n. Thus, although the illustration of FIG. 3 shows the different glide vents 320 is similar locations and positions on the respective ram air wings 310, generally, the glide vents 310 in a ram air canopy 300 do not have to be in the same location and position, relative to the leading edge 306 of the ram air canopy 300. The positions and locations of the glide vents 320 can vary for a particular ram air canopy design. FIG. 6 illustrates on such arrangement.

In the example of FIG. 6, the ram air canopy 600 includes a plurality of ram air wings 610, each with a top surface 602. A glide vent 620 is disposed in the top surface 602 of the different ram air wings 620. As is illustrated in the example of FIG. 6, the vents 620 are generally arranged or disposed in different positions or locations on different ram air wings 610, relative to the leading edge or nose 606 of the ram air canopy 600.

Figure 7:
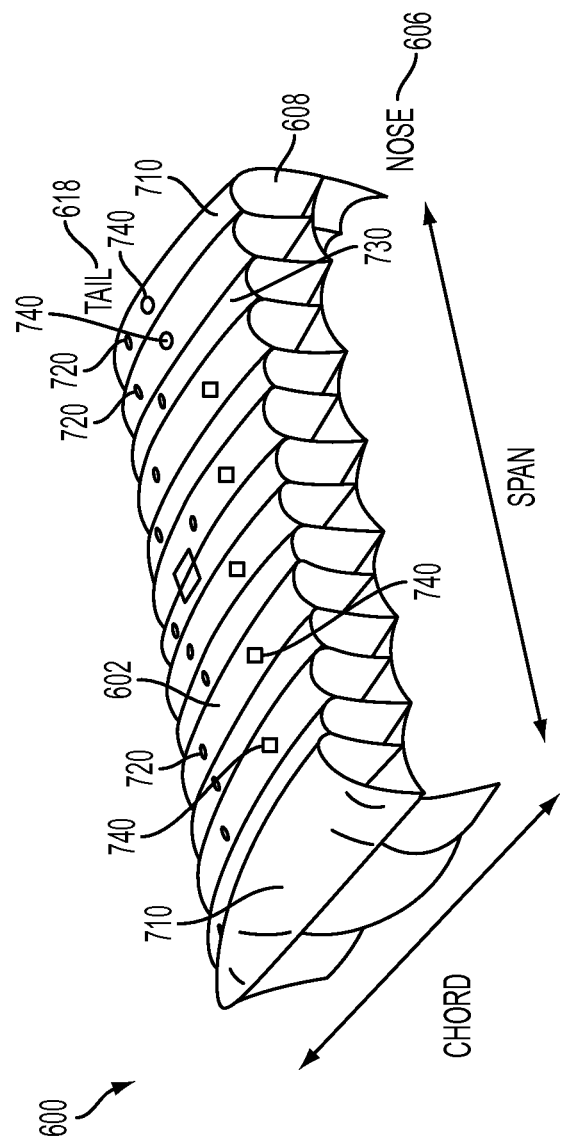
FIG. 7 illustrates a perspective illustration of another embodiment of exemplary ram air canopy incorporating aspects of the present disclosure.

Although a ram air wings 310, 610 shown in FIGS. 3 and 6 include only one glide vent 320, 620, in alternate embodiments, a ram air wing 310 can include one or more vents 320. FIG. 7 illustrates such a configuration. In the example of FIG. 7, the ram air wing 710 includes a first glide vent 720 and a second glide vent 740. In alternate embodiments, any suitable number of glide vents 720, 740 can be included, in any suitable locations and positions, depending upon the particular ram air canopy design and configuration. It is also noted that the glide vents 720, 740 can be aligned in similar positions, such as the embodiment shown in FIG. 3, or in varied positions as shown in FIG. 6. Also, one ram air wing 710 may include the glide vents 720, 740, while another ram air wing or cell 730 may include only one glide vent 720. Although only two glide vents 720, 740 are shown, it will be understood that more than two glide vents can be implemented. The arrangement and number of glide vents 720, 740 can be based on the exit flow desired.

Referring again to FIGS. 3-5, in one embodiment, the glide vent 320 is configured to remain closed during an opening phase of the ram air canopy 300. This is generally the phase where the ram air canopy 300 is actuated or deployed, and each of the ram air wings 310 that make up the ram air canopy 300 start to fill with air. The glide vents 320 can be actuated to the open state after the opening phase of the ram air canopy 300 is complete. In one embodiment, the glide vent 320 can be sensitive or reactive to a build up of air in the ram air wing 310, or air pressure, and be configured to open when a certain amount of air has built up, or a certain air pressure realized.

In one embodiment, the glide vent 320 can also include a fabric nozzle that is configured to direct the flow of air out of the opening of the glide vent 320 and along an outside of the top surface of the ram air canopy. The glide vent 320 can also include a damper grate or other pieces of material that can be used to smooth the flow of air exiting the opening of the glide vent 320.

In one embodiment, the glide vents 320 in the ram air canopy 300 can be individually controlled, or controlled as a group. By being able to individually control individual ones of the glide vents 320 of the ram air canopy 300, the glide path of the ram air canopy can be controlled. For example, by keeping the glide vents 320 on one side of the ram air canopy 300 in an open state, and the glide vents 320 on the other side in a closed state, there will be less drag on the one side of the ram air canopy 300 with glide vents in the open state. The ram air canopy 300 will then turn, due to the differences in drag from one side to the other. In this manner, by selectively opening different ones of the glide vents 320, either individually or as a group, steering of the ram air canopy can be controlled.

Figure 8:
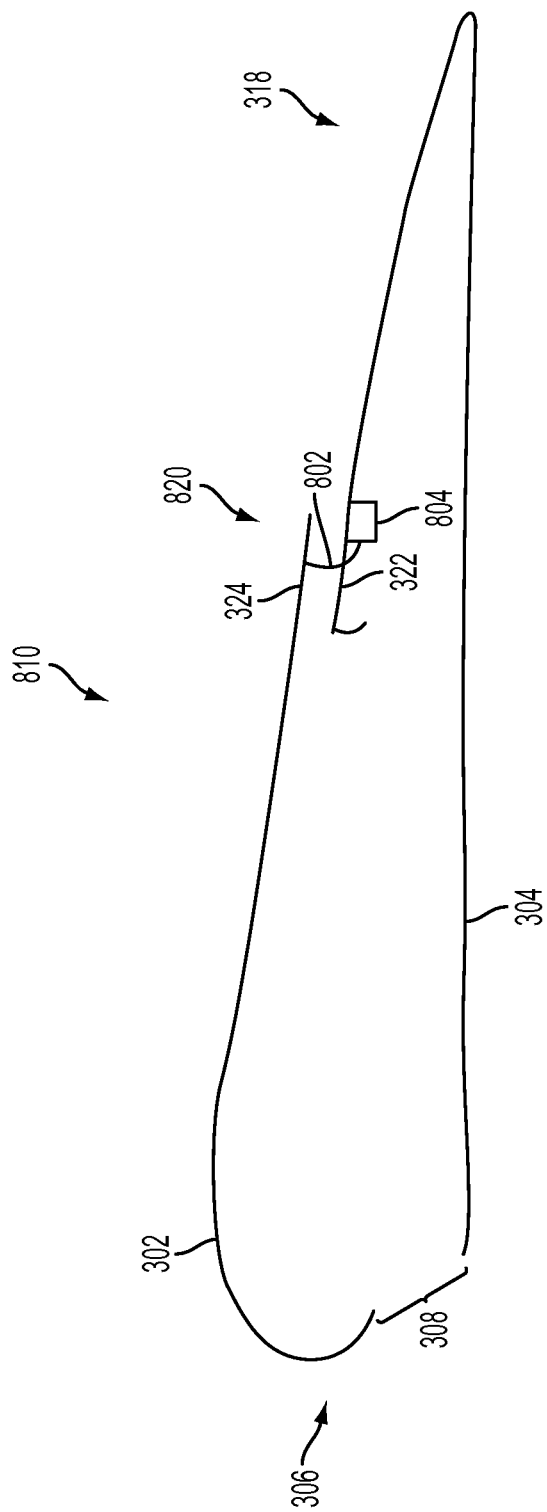
FIG. 8 illustrates a chord wise illustration of one embodiment of an exemplary ram air canopy incorporating aspects of the present disclosure.

The opening and closing of the glide vent 320 can controlled in a number of ways. In one embodiment, referring to FIG. 8, the ram air canopy 810 can include one or more control lines 802 that can be manipulated to open and close the glide vent 320. For example, one or more control lines 802 can be run from the lower surface or member 322 of the glide vent 320 to the upper member 324 or top surface. A control device 804 is operably coupled to the control line(s) 802 and can be used to open and close the glide vent 320. In one embodiment, the control device 804 can be radio controlled. For example, the control device 804 can comprise a radio controlled winch. In alternate embodiments, the control device 804 can comprise any suitable radio controlled device that can be used to control the opening and closing of the glide vent 820. Radio signals can be sent to the winch(es) to control the opening and closing of one or more of the glide vents 320. In alternate embodiments, the opening and closing of a glide vent 320 can be controlled in any suitable manner.

Simulations have indicated that by allowing air to flow through the ram air wing 310, from the opening 308 and out the glide vent 320, that lift is increased by approximately 45%. This is a significant change to the air flow characteristics of the ram air canopy 300, as well as the aerodynamic forces associated with a ram air canopy 300.

The ram air canopy of the disclosed embodiments addresses the problem of the flow separation bubble or area that forms on the leading edge of the ram air canopy. A vent is provided in the top surface of the ram air canopy. The vent allows air to flow out of, or exit, the respective cell or ram air wing of the ram air canopy. The vents can be positioned in any suitable location of the top surface of the ram air canopy, relative to the leading edge of the ram air canopy. The position, location and size, and in some cases the number, of the vents will be airfoil dependent. The vents can be in different locations and positions on the top surface of the ram air canopy, depending upon the type of airfoil, or ram air canopy. By minimizing or limiting the region of flow separation, or the flow separation bubble, on the leading edge of the canopy, the lift is increased and there is an improvement in the glide capability of the ram air canopy.

Thus, while there have been shown, described and pointed out, fundamental novel features of the invention as applied to the exemplary embodiments thereof, it will be understood that various omissions and substitutions and changes in the form and details of devices and methods illustrated, and in their operation, may be made by those skilled in the art without departing from the spirit of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A ram air canopy parachute, comprising:
   a top skin;
   a bottom skin;
   a plurality of ribs between the top skin and the bottom skin forming a plurality of cells;
   a leading edge of a cell including an opening to allow air to enter the cell; and
   a glide vent disposed in the top skin to allow air the exit the cell; and
   further comprising a control device operably coupled to the glide vent with a control line, wherein the control device controls an opening and closing of the glide vent.

2. The ram air canopy parachute of claim 1, wherein the glide vent is disposed in a trailing edge of the cell.

3. The ram air canopy parachute of claim 1, the ram air canopy parachute comprises a plurality of glide vents, wherein one glide vent on one cell is disposed in a different location on the one cell relative to a location of another glide vent disposed on another cell.

4. The ram air canopy parachute of claim 1, comprising a plurality of glide vents disposed in the top surface of the cell.

5. The ram air canopy parachute of claim 1, wherein the glide vent comprises an upper member and a lower member, wherein the upper member extends over the lower member.

6. The ram air canopy of claim 5, wherein the glide vent has an open state and a closed state, and wherein the upper member and the lower member defining an opening therebetween in the open state of the glide vent.

7. The ram air canopy of claim 6, wherein the upper member is configured to seal against the lower member in the closed state of the glide vent.

8. The ram air canopy parachute of claim 6, wherein the glide vent is configured to open after the opening phase of the ram air canopy parachute.

9. The ram air canopy parachute of claim 1, wherein the glide vent is configured to remain in a closed state during an opening phase of the ram air canopy parachute.

10. The ram air canopy parachute of claim 1, wherein the glide vent is configured to remain in a closed state during an actuation state of the ram air canopy parachute and change to an open state after the actuation state of the ram air canopy parachute.

11. The ram air canopy parachute of claim 1, wherein the control device is a radio controlled winch.

12. The ram air canopy parachute of claim 1, comprising a plurality of glide vents, a winch operably coupled to one or more of the plurality of glide vents, wherein each winch is selectively operated to open and close individual ones of the plurality of glide vents.

13. A ram air canopy wing, comprising:
    a top surface;
    a bottom surface;
    the top surface and the bottom surface defining an opening therebetween to allow air to flow into the ram air wing; and
    a glide vent disposed in the top surface to allow the air to exit the ram air wing; and further comprising a control device operably coupled to the glide vent and configured to control an opening and closing of the glide vent.

14. The ram air canopy wing of claim 13, comprising a leading edge and a trailing edge, wherein the glide vent is disposed in the trailing edge.

15. The ram air canopy wing of claim 13, wherein a plurality of glide vents are disposed in the top surface.

16. The ram air canopy wing of claim 13, wherein the glide vent defines an opening in the top surface of the ram air canopy wing.

17. The ram air canopy wing of claim 13, wherein the glide vent has an open state and a closed state, the glide vent being in the closed state during an opening phase of the ram air canopy wing and in the open state after the opening phase is complete.

18. The ram air canopy wing of claim 17, wherein the glide vent comprises a first member and a second member, the first member configured to seal against the second member during the closed state of the glide vent.

* * * * *